US011677458B2

(12) United States Patent
Wiegner et al.

(10) Patent No.: US 11,677,458 B2
(45) Date of Patent: Jun. 13, 2023

(54) FLIGHT DATA ASSISTED ACTIVE ANTENNA SYSTEM FOR AIR-TO-GROUND APPLICATIONS

(71) Applicant: Nokia Solutions and Networks Oy, Espoo (FI)

(72) Inventors: Dirk Wiegner, Schwaikheim (DE); Wolfgang Tempi, Sersheim (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 17/294,778

(22) PCT Filed: Nov. 20, 2018

(86) PCT No.: PCT/EP2018/081934
§ 371 (c)(1),
(2) Date: May 18, 2021

(87) PCT Pub. No.: WO2020/104018
PCT Pub. Date: May 28, 2020

(65) Prior Publication Data
US 2021/0409107 A1 Dec. 30, 2021

(51) Int. Cl.
*H04B 7/185* (2006.01)
*H04B 7/0413* (2017.01)
*H04B 7/06* (2006.01)

(52) U.S. Cl.
CPC ....... *H04B 7/18506* (2013.01); *H04B 7/0413* (2013.01); *H04B 7/0626* (2013.01); *H04B 7/18519* (2013.01); *H04B 7/18526* (2013.01)

(58) Field of Classification Search
CPC ............. H04B 7/18506; H04B 7/0413; H04B 7/0626; H04B 7/18519; H04B 7/18526
See application file for complete search history.

(56) References Cited

U.S. PATENT DOCUMENTS

| 7,107,062 B2 | 9/2006 | Cruz et al. |
| 2016/0099769 A1 | 4/2016 | Moffatt et al. |

(Continued)

FOREIGN PATENT DOCUMENTS

| EP | 2963984 A1 | 1/2016 |
| EP | 3160194 A1 | 4/2017 |

(Continued)

OTHER PUBLICATIONS

"Direct Air-to-ground Communication—Broadband for Planes (DA2GC-B4P)", Airbus, Mar. 27, 2012, 6 pages.

(Continued)

*Primary Examiner* — Janice N Tieu
(74) *Attorney, Agent, or Firm* — Kramer & Amado, P.C.

(57) ABSTRACT

Methods and apparatuses for controlling radio resources of radio units in air-to-ground mobile communications systems that include at least an aircraft carrying a transceiver station and a ground basestation, apt to communicate with each other. The radio units are provided with beamforming and/or massive MEM antenna systems, and are controlled by the apparatuses using control data. The apparatuses are configured to receive flight data related to the aircraft, estimate a timed trajectory and a required data rate, as a function of the flight data. Then the apparatuses determine a sequence of control data for said antenna systems to form radio beams and/or connectivity spots directed towards said transceiver station, respectively to the ground basestation, while the allocated data rate is at least equal to the required data rate. The sequence of control data is then provided to respective antenna systems.

10 Claims, 10 Drawing Sheets

(56) References Cited

U.S. PATENT DOCUMENTS

| | | | |
|---|---|---|---|
| 2016/0119845 A1 | 4/2016 | Lu et al. | |
| 2017/0366250 A1 | 12/2017 | Ovens et al. | |
| 2018/0006371 A1 | 1/2018 | Dang et al. | |
| 2018/0019789 A1 | 1/2018 | Hyslop et al. | |
| 2018/0240348 A1* | 8/2018 | Ren | G08G 5/0043 |
| 2019/0045348 A1* | 2/2019 | Li | H04W 16/28 |
| 2020/0296649 A1* | 9/2020 | Dudzinski | H04W 36/08 |
| 2021/0159971 A1* | 5/2021 | Panchai | H04B 7/1855 |
| 2021/0352559 A1* | 11/2021 | Casamayon | H04B 7/18506 |

FOREIGN PATENT DOCUMENTS

| | | |
|---|---|---|
| WO | 2013/056136 A1 | 4/2013 |
| WO | 2017/019595 A1 | 2/2017 |
| WO | 2018/078004 A1 | 5/2018 |
| WO | 2018/174822 A1 | 9/2018 |
| WO | 2019/158207 A1 | 8/2019 |

OTHER PUBLICATIONS

International Search Report and Written Opinion received for corresponding Patent Cooperation Treaty Application No. PCT/EP2018/081934, dated Jul. 19, 2019, 12 pages.

\* cited by examiner

FLIGHT DATA ASSISTED ACTIVE ANTENNA SYSTEM FOR AIR-TO-GROUND APPLICATIONS

RELATED APPLICATION

This application claims priority to PCT Application No. PCT/EP2018/081934, filed on Nov. 20, 2018, each of which is incorporated herein by reference in its entirety.

TECHNICAL FIELD

Various example embodiments relate to mobile radio communications for air-to-ground systems providing wireless connections to users in flying aircrafts. More precisely, the air-to-ground systems comprise multi-antenna systems, in particular beamforming and massive MIMO mobile radio access systems.

BACKGROUND

Air-to-ground systems are providing wireless connection to flying aircrafts and providing mobile radio connectivity to passengers and aircraft subsystems.

Macro base stations are used to serve a plurality of cells providing a spatial coverage including possible aircrafts trajectories. The power is transmitted over the whole spatial coverage range of the base station, disregarding presence or position of users within the spatial coverage zone. In case of aircraft passengers and aircraft subsystems, power is transmitted over the whole spatial coverage whether or not there are currently aircrafts in a certain spatial spot.

Thus, energy efficiency of the system is not optimal, the transmitted power being distributed between areas where no connectivity is required, and areas where it has to be shared by the aircrafts requiring air-to-ground connection within the same coverage range of the radio access system. This reduces available bandwidth and thus data rate for each aircraft and thus per user/passenger in the respective aircrafts. Moreover, the actual data rate requirements, determined by the number of aircrafts, users and users' devices, are unknown and therefore cannot be addressed properly.

In the context of air-to-ground connections, beamforming active antenna systems are used in order to ensure a spatial coverage of regions potentially traversed by aircrafts. Nevertheless, this technique does not take into account the actual timing, data rate and quality of service requirements and does not support none-line-of-sight connectivity as massive MIMO can do.

Therefore, there is a need for controlling radio resources in an air-to-ground communications system, in an improved energy efficient manner while maintaining or improving quality of service and network performance.

SUMMARY

Various example embodiments propose apparatuses, methods and computer programs for controlling radio resources in a mobile communications system.

Example embodiments propose a method for controlling radio resources of at least one radio unit of at least one base station in a mobile communications system, said radio unit being provided with a beamforming and/or a massive MIMO antenna system and being apt to establish a telecommunication link with at least one transceiver station carried by an aircraft, the method being implemented by an apparatus configured to control said antenna system by using control data, the method comprising the steps of:
  receiving flight data related to said aircraft;
  estimating a timed trajectory of said aircraft, as a function of the flight data;
  evaluating a required data rate for connection of said transceiver station to said base station, as a function of the flight data;
  determining a sequence of control data for said antenna system
    form and/or select at least a radio beam and/or a connectivity spot directed towards said transceiver station; and
    allocate a data rate at least equal to the evaluated required data rate; and
  providing the sequence of control data to said antenna system.

In some embodiments the method may be implemented in a mobile communications system comprising a plurality of radio units, the apparatus being configured to control the antenna systems of the plurality of radio units. In these embodiments, the step of evaluating the required data rate may comprise:
  obtaining information related to traffic load and/or traffic conditions of the plurality of radio units; and
  coordinating the data rate allocation and/or handover between said radio units.

In other embodiments, the method may be implemented in a mobile communications system comprising a plurality of apparatuses for controlling radio resources and a plurality of radio units, an apparatus being associated to a radio unit. The apparatuses may further comprise at least a bidirectional communications port enabling communication between said apparatuses. In these embodiments, the step of evaluating the required data rate may comprise:
  exchanging with at least another apparatus information related to respective traffic load and/or traffic conditions of associated radio units;
  coordinating the data rate allocation and/or handover between said radio units.

According to example embodiments, the method may be implemented in a mobile communication system further comprising a content data center apt to transfer data content to the transceiver station, the method further comprising the steps of:
  receiving an indication of data to be transferred from the content data center to the transceiver station;
  identifying the base stations in the coverage zone of which the aircraft moves along the timed trajectory and the time and duration of coverage for each of identified base stations;
  sending to the content data center a distribution request of the data content among identified base station for further transfer from identified base station to the transceiver station.

In some embodiments of the method, the step of determining the sequence of control data comprises the steps of:
  finding an identifier of said timed trajectory;
  retrieving a previously stored sequence of control data associated to said identifier of the timed trajectory;
  computing the sequence of control data, as a function of said previously stored sequence of control data; and
  storing the sequence of control data.

In various embodiments, the radio unit may be provided with a massive MIMO antenna system, and the method's step of determining the sequence of control data further comprises, previously to computing the sequence of control data, updating channel state information for said antenna system. In these embodiments, the step of computing the sequence of control data, is further a function of the updated channel state information.

Example embodiments propose a method for controlling radio resources of at least one radio unit of at least one base station in a mobile communications system, said radio unit being provided with a beamforming and/or a massive MIMO antenna system and being apt to establish a telecommunication link with at least one transceiver station carried by an aircraft, the method being implemented by an apparatus configured to control said antenna system by using control data. The method comprises the steps of:

receiving flight data related to said aircraft;
estimating a timed trajectory of said aircraft, as a function of the flight data;
finding an identifier of said timed trajectory;
retrieving a previously stored sequence of control data associated to said identifier;
computing a sequence of control data, as a function of said previously stored sequence of control data such that said antenna system form and/or select at least a radio beam and/or a connectivity spot directed towards said transceiver station;
storing the sequence of control data;
providing the sequence of control data to said antenna system.

In some embodiments, the radio unit is provided with a massive MIMO antenna system, and the method's step of determining the sequence of control data further comprises, previously to computing the sequence of control data, updating channel state information for said antenna system; computing the sequence of control data is further a function of the updated channel state information.

Example embodiments propose a method for controlling radio resources of at least one radio unit of at least one transceiver station carried by an aircraft, said radio unit being provided with a beamforming and/or a massive MIMO antenna system, and being apt to establish a telecommunication link with at least one base station in a mobile communications system, the method being implemented by an apparatus configured to control said antenna system by using control data. The method may comprise the steps of:

obtaining flight data related to said aircraft and location data related to said base station;
estimating a timed position of said aircraft relative to said base station, as a function of the flight data and location data;
evaluating a required data rate for connection of said transceiver station to said base station as a function of the flight data;
determining a sequence of control data for said antenna system
to form and/or select at least a radio beam and/or a connectivity spot directed towards said base station; and
to allocate a data rate at least equal to the evaluated required data rate; and
providing the sequence of control data to said antenna system.

In various embodiments, the method may be implemented in a mobile communication system further comprising a content data center apt to transfer data content to the transceiver station, the method further comprising:

receiving an indication of data to be transferred from the content data center;
identifying the base stations in the coverage area of which the aircraft moves along the timed trajectory, and the time and duration of coverage for each of identified base stations;
sending to the content data center a distribution request of the data content among identified base station for further transfer from identified base station to the transceiver station.

In some embodiments the method's step of determining the sequence of control data comprises the steps of:
finding an identifier of said timed trajectory;
retrieving a previously stored sequence of control data associated to said identifier of the timed trajectory;
computing the sequence of control data, as a function of said previously stored sequence of control data; and
storing the sequence of control data.

In various embodiments the radio unit may be provided with a massive MIMO antenna system; the method's step of determining the sequence of control data further comprises, previously to computing the sequence of control data, updating channel state information for said antenna system; in these embodiments, computing the sequence of control data, is further a function of the updated channel state information.

Example embodiments propose a method for controlling radio resources of at least one radio unit of at least one transceiver station carried by at least one aircraft, said radio unit being provided with a beamforming and/or a massive MIMO antenna system, and being apt to establish a telecommunication link with at least one base station in a mobile communications system, the method being implemented by an apparatus configured to control said antenna system by using control data. The method comprises the steps of:

obtaining flight data related to said aircraft and location data related to said base station;
estimating a timed position of said aircraft relative to said base station, as a function of the flight data and location data;
finding an identifier of said timed position;
retrieving a previously stored sequence of control data associated to said identifier;
computing a sequence of control data, as a function of said previously stored sequence of control data such that said antenna system form and/or select at least a radio beam and/or a connectivity spot directed towards said base station;
storing the sequence of control data;
providing the sequence of control data to said antenna system.

In some embodiments, the radio unit is provided with a massive MIMO antenna system, and the method's step of determining the sequence of control data further comprises, previously to computing the sequence of control data, updating channel state information for said antenna system; computing the sequence of control data is further a function of the updated channel state information.

Various embodiments propose computer program code containing instructions which cause, when executed by a processor, the performance of the steps of any of above mention methods.

Example embodiments propose a computer readable storage medium, storing a computer program code as previously mentioned.

Example embodiments propose a data carrier signal, carrying a computer program code as previously mentioned.

Example embodiments propose an apparatus for controlling radio resources of at least one radio unit of at least one base station in a mobile communications system, said radio unit being provided with a beamforming active antenna system and/or a massive MIMO antenna system, and being apt to establish a telecommunication link with at least one transceiver station carried by an aircraft. The apparatus is configured to control said antenna system by using control data, and comprises:

means for receiving flight data related to said aircraft;
    means for estimating a timed trajectory of said aircraft, as a function of the flight data;
    means for evaluating a required data rate for connection of said transceiver station to said base station, as a function of the flight data;
    means for determining a sequence of control data for said antenna system
        to form and/or select at least a radio beam and/or a connectivity spot directed towards said transceiver station; and
        to allocate a data rate at least equal to the evaluated required data rate; and
    means for providing the sequence of control data to said antenna system.

Example embodiments propose an apparatus for controlling radio resources of at least one radio unit of at least one base station in a mobile communications system, said radio unit being provided with a beamforming active antenna system and/or a massive MIMO antenna system, and being apt to establish a telecommunication link with at least one transceiver station carried by an aircraft, the apparatus being configured to control said antenna system by using control data, the apparatus being configured to:

receive flight data related to said aircraft;
    estimate a timed trajectory of said aircraft, as a function of the flight data;
    evaluate a required data rate for connection of said transceiver station to said base station, as a function of the flight data;
    determine a sequence of control data for said antenna system
        form and/or select at least a radio beam and/or a connectivity spot directed towards said transceiver station; and
        allocate a data rate at least equal to the evaluated required data rate; and
    provide the sequence of control data to said antenna system.

In some embodiments, above mentioned apparatus may comprise at least one input communications port, at least one output communications port, at least one processor and at least one memory including computer program code. Said computer program code is configured to, with said processor, cause at least the performance of the apparatus.

Various embodiments propose a base station comprising an apparatus as above described.

Other embodiments propose an apparatus for controlling radio resources of at least one radio unit of at least one transceiver station carried by an aircraft, said radio unit being provided with a beamforming and/or a massive MIMO antenna system, and being apt to establish a telecommunication link with at least one base station in a mobile communications system. The apparatus may be configured to control said antenna system by using control data, and may comprise:

means for obtaining flight data related to said aircraft and location data related to said base station;
    means for estimating a timed position of said aircraft relative to said base station, as a function of the flight data and location data;
    means for evaluating a required data rate for connection of said transceiver station to said base station, as a function of the flight data;
    means for determining a sequence of control data for said antenna system
        to form and/or select at least a radio beam and/or a connectivity spot directed towards said base station; and
        to allocate a data rate at least equal to the evaluated required data rate; and
    means for providing the sequence of control data to said antenna system.

Example embodiments propose an apparatus for controlling radio resources of at least one radio unit of at least one radio unit of at least one transceiver station carried by an aircraft, said radio unit being provided with a beamforming and/or a massive MIMO antenna system, and being apt to establish a telecommunication link with at least one base station in a mobile communications system, the apparatus being configured to control said antenna system by using control data, the apparatus being configured to:

obtain flight data related to said aircraft and location data related to said base station;
    estimate a timed position of said aircraft relative to said base station, as a function of the flight data and location data;
    evaluate a required data rate for connection of said transceiver station to said base station as a function of the flight data;
    determine a sequence of control data for said antenna system
        to form and/or select at least a radio beam and/or a connectivity spot directed towards said base station; and
        to allocate a data rate at least equal to the evaluated required data rate; and
    provide the sequence of control data to said antenna system.

In some embodiments, the apparatus may comprise:
    at least one input communications port;
    at least one output communications port;
    at least one processor and at least one memory including computer program code. The computer program code is configured to, with said processor, cause the performance of the apparatus.

Various embodiments propose an aircraft comprising an apparatus as above described.

BRIEF DESCRIPTION OF THE FIGURES

Some embodiments are now described, by way of example only, and with reference to the accompanying drawings, in which.

Identical features shown on FIGS. 1 to 10 are hereafter identified by identical reference numbers.

DESCRIPTION OF EMBODIMENTS

Figure 1:
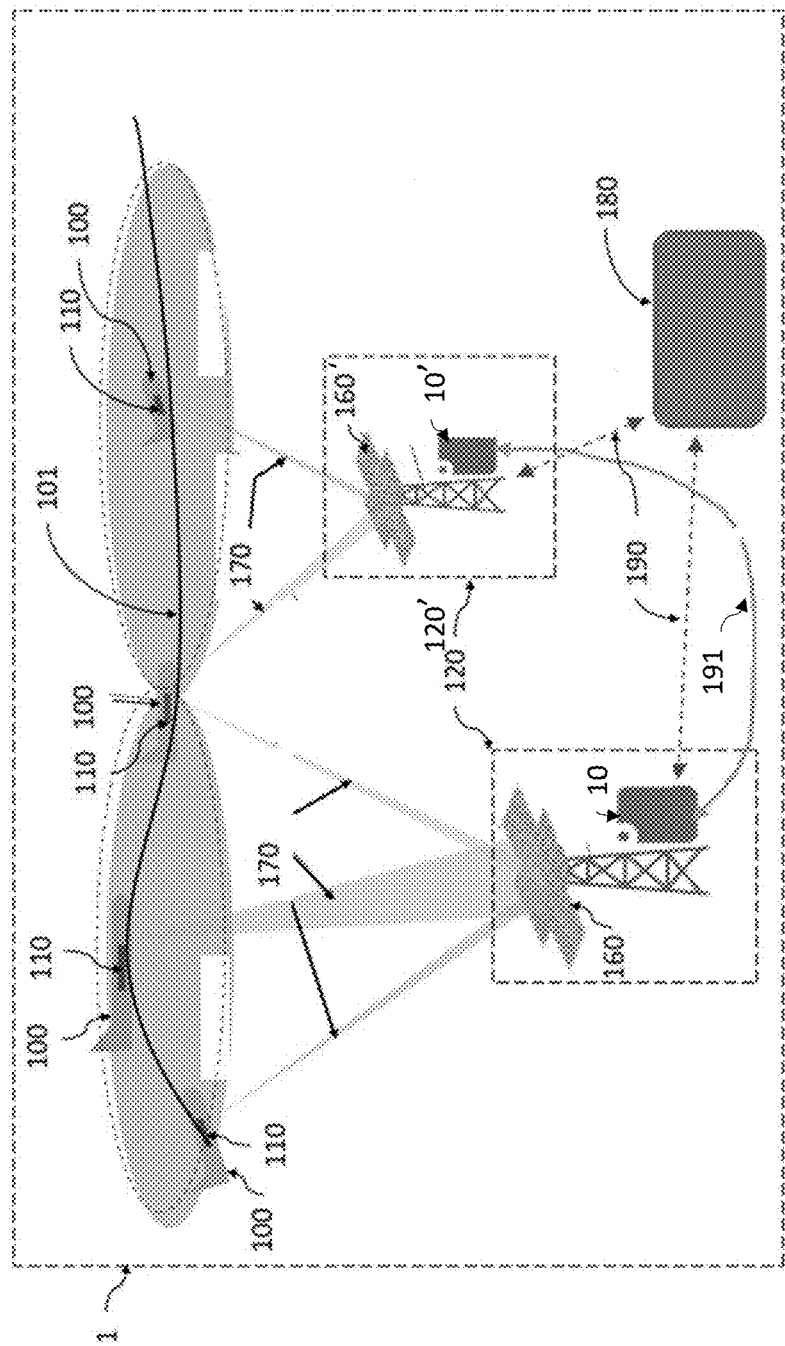
FIG. 1 shows an example embodiment of an air-to-ground communications system.

FIG. 1 illustrates an air-to-ground mobile communications system 1, comprising base stations 120, 120' providing connectivity for one or more user devices or aircraft systems 110 carried by aircraft 100 moving in a coverage region of base stations 120, 120'. It is to be noted that connectivity for said user devices and aircraft subsystems 110 may be provided indirectly, via a transceiver station and an on board relay carried by the aircraft 100, as it will be described hereafter.

The base stations 120, 120' include respective radio units provided with beamforming multi-antenna systems and/or massive multiple-input and multiple-output, MIMO, antenna systems 160, 160'. Operation of antenna systems is controlled by apparatuses 10 and 10'.

The aircraft systems and user devices 110 carried by the aircraft crossing the connectivity region are connected via the transceiver station and on board relay to the base stations 120, 120'. Connections are established using steered radio beams or spatially punctual radio connections 170, the transmit power of the radio access system being directed to the aircraft, following its flight route. In case of massive MIMO operation, the spatially punctual radio connections 170 may be obtained by constructive superposition of scattered reflected signals, and provide line-of-sight or non-line-of sight radio connections.

A flight control center 180 is configured to connect via data links 190 to apparatuses 10 and 10', in order to provide flight data related to aircraft 100. In some embodiments said apparatuses 10 and 10' are able to connect to each other by a data link 191.

Flight data include trajectory related elements, allowing an estimation of three-dimension coordinates of the aircraft's trajectory, and moments in time when the aircraft is at respective coordinates, in other words a timed trajectory 101 of the aircraft 100. The timed trajectory combined with knowledge of coverage area of base stations 120, 120' enable estimation of expected times for cell hand-overs.

Flight data also include user related elements, specifically the number of potential user devices and the number and characteristics of aircraft subsystems 110 to be connected, thus enabling the evaluation of required data rates.

By activating merely the required number of transceivers of the beamforming and/or massive MIMO antenna system, necessary to connect the actual number of user devices 110 and by steering the respective radio beams and/or connectivity spots to follow the flight route of the aircraft 100 carrying the user devices 110, the power consumption of the multi antenna system can be optimized and adapted to actual situations, allowing for reduced radio access system power consumption. In embodiments supporting both beamforming and massive MIMO operation, it can be decided during operation which technique is currently more beneficial from e.g. connectivity and energy efficiency point of view.

Control of transceivers activation, beams orientation and width, in case of beamforming antenna systems, and position of connectivity spots, line-of-sight, LoS, or none-line-of-sight, NLoS, in case of massive MIMO system, can be obtained by using control data. The control data comprise a set of parameters, antenna weights, i.e. signal phases and amplitudes, transmit power levels which applied to transceivers and antenna elements determine a specific power to be transmitted, a specific direction and width of steered radio beam, and/or a specific position of connectivity spots, LoS or NLoS.

As an aircraft moves along its trajectory, the characteristics of the required radio beam, and/or connectivity spots, and transmission power can change, and a new set of parameters, in other words different control data, should be applied. Moreover, the new control data should be applied at specific moment, in order to generate the radio beams and/or connectivity spots, LoS or Nlos, in a timed manner, following the timed trajectory 101 of the aircraft. A set of control data, to be applied to the antenna system in a timed manner, can be defined as a sequence of control data. Operation of antenna systems 160, 160' is controlled by apparatuses 10 and 10' by using the sequence of control data. In various embodiments the apparatus 10, 10' may be directly placed in the antenna system 160, 160', in the radio unit 150,150', in the baseband unit of the base station 120, 120', or it may be a distinct device.

Figure 2:
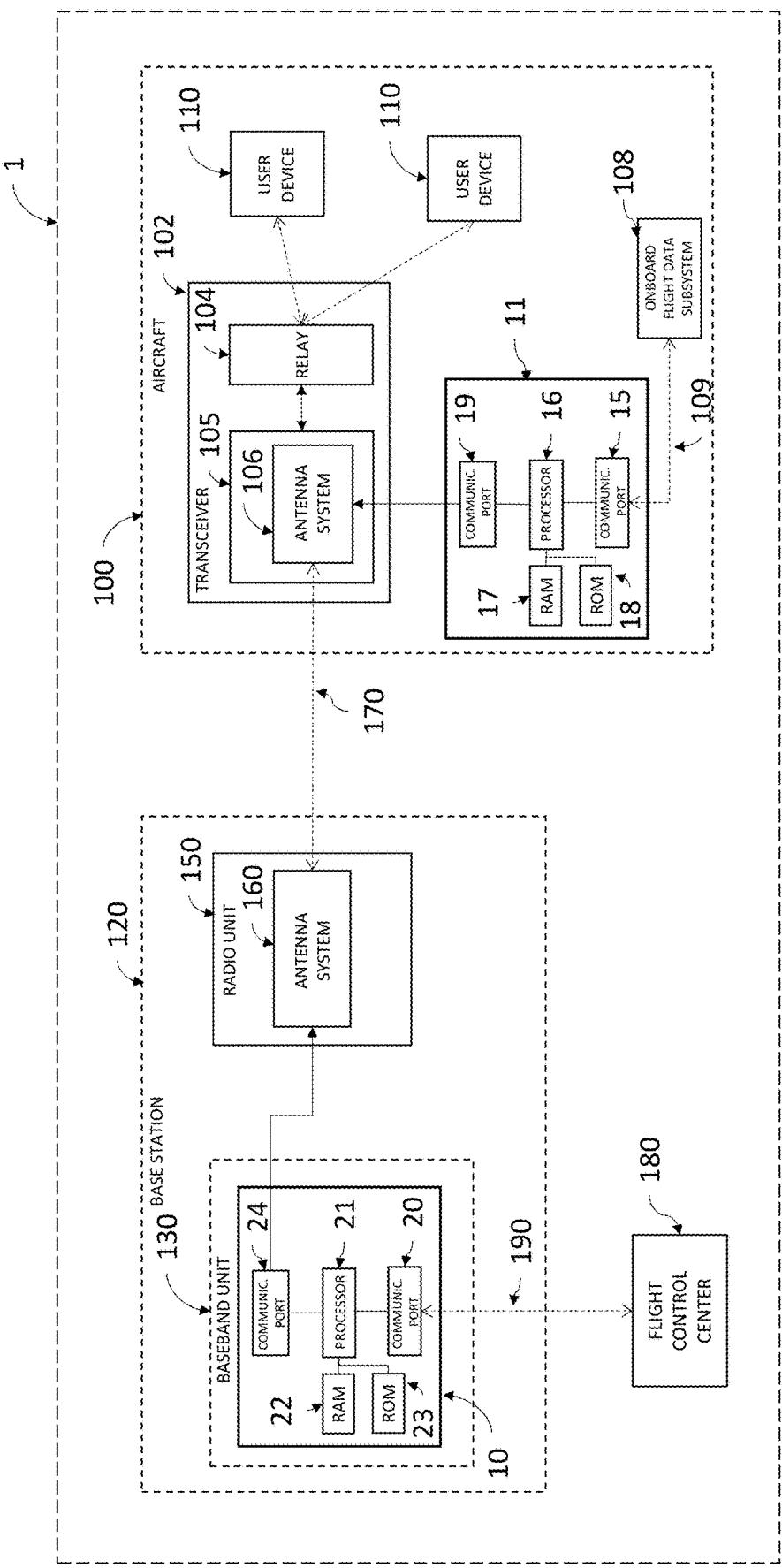
FIGS. 2, 3, 4 and 5 show example embodiments of apparatuses for controlling radio resources in an air-to-ground communications system.

FIG. 2 shows example embodiments of apparatuses 10 and 11 configured to control respectively radio resources of a radio unit 150, located in a baseband unit 130 of a base station 120, and of a radio unit 105, comprised in the transceiver station 102 carried by the aircraft 100. The radio units 105, 150 are provided with respective beamforming active antenna systems and/or massive MIMO antenna systems 106, 160, thus being apt to wirelessly connect to each other, and provide connectivity, via the on board relay 104, to one or more aircraft subsystems and user devices 110 carried by the aircraft 100.

The apparatuses 10, 11 comprise respectively a processor 21, 16, and memories RAM 22, 17, and ROM 23, 18 closely coupled to the processor 21, 16. The apparatuses 10, 11 may comprise communication ports 20, 24 respectively 15, 19. Processors 21, 16 are connected to each of components 20, 22, 23, 24, respectively 15, 17, 18, 19 in order to control operation thereof.

The apparatuses 10, 11 may comprise a non-volatile memory a hard disk drive, HDD, or a solid state drive, SSD, not represented in FIG. 2. The ROM memory 23, 18, stores, amongst other things, an operating system and may store software applications. The RAM memories 22, 17 are used respectively by processors 21, 16 for the temporary storage of data. The operating system may contain code which, when executed by the processors 21, 16, implements aspects of methods described in this specification.

The processors 21, 16 may take any suitable form. For instance, each may be a microcontroller, plural microcontrollers, a processor, or plural processors.

The processing system may be a standalone computer, a server, a console, or a network thereof.

In some embodiments, the processors 21, 16 and memories 22, 23, and 17, 18, may also be associated with external software applications. These may be applications stored on a remote server device and may run partly or exclusively on the remote server device. These applications may be termed cloud-hosted applications. The apparatuses 10, 11 may be in communication with the remote server device in order to utilize the software application stored there.

Apparatuses 10, 11 may comprise an input communications port 20, 15 for connection to respectively the flight control center 180, and on board flight data subsystem 108. In some embodiments the communications port 20, 15 may be bidirectional, enabling transmission of aircraft technical data to the flight center and to on board flight data subsystem 108.

The apparatuses 10, 11 also comprise output communications ports 24, 19 respectively, for providing control data to the antenna systems 160, respectively 106. In some embodiments the communications ports 24, 19 may be bidirectional, allowing the apparatuses 10, 11, to receive channel state information from the antenna system 160, 106 and/or from the radio units 150, 105. This feature is particularly advantageous in case of massive MIMO operation, allowing to monitor the channel and its changes, e.g. scattering, reflections, distortions, etc, in order to enable periodically updated antenna weights in order to ensure that superposition of the individual antennas signals can be continuously achieved at the users, especially if the users are moving and or the channel changes. The updated antenna weights will then be applied to the signals of the individual antenna paths.

It is to be noted that in various embodiments apparatuses 10 and/or 10' may be implemented for controlling radio resources of the base stations 120, 120', independently of the aircraft being equipped or not with an apparatus 11. Thus, in the mobile communication system 1 aircrafts could be equipped either with beamforming or massive MIMO antenna systems 160, 160', cooperating with an apparatus 11 for controlling radio resources of respective antenna systems, or with a simple antenna spanning a sector, if lower complexity in the aircraft is useful or sufficient. In the later case, the apparatuses 10, 10', provide optimization of transmitted power of base stations. Conversely, an aircraft may be equipped with beamforming or massive MIMO antenna systems 106 and associated apparatus 11 for controlling the radio resources of the embedded transceiver 102, independently of base stations implementing or not the method for controlling radio resources and being equipped or with apparatuses 10, 10'.

Figure 6:
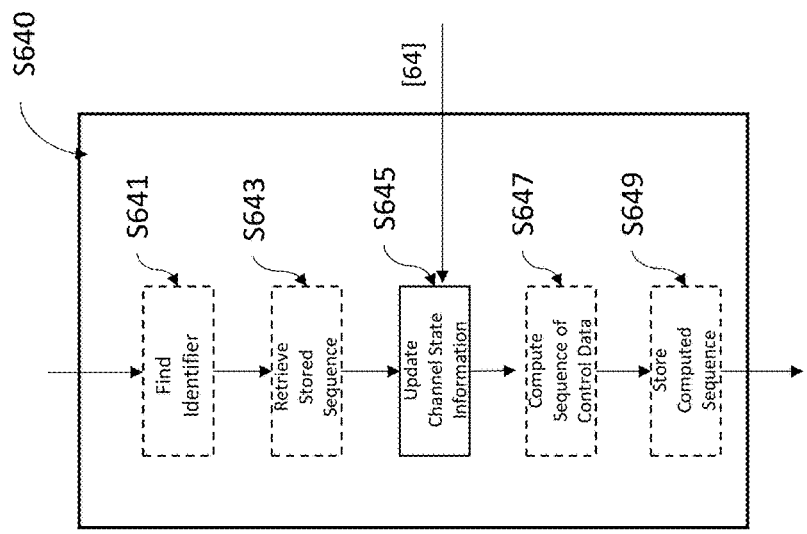
FIGS. 6, 7, 8 and 9 illustrate flowcharts of example embodiments of a method of controlling radio resources air-to-ground communications system.
Figure 6:
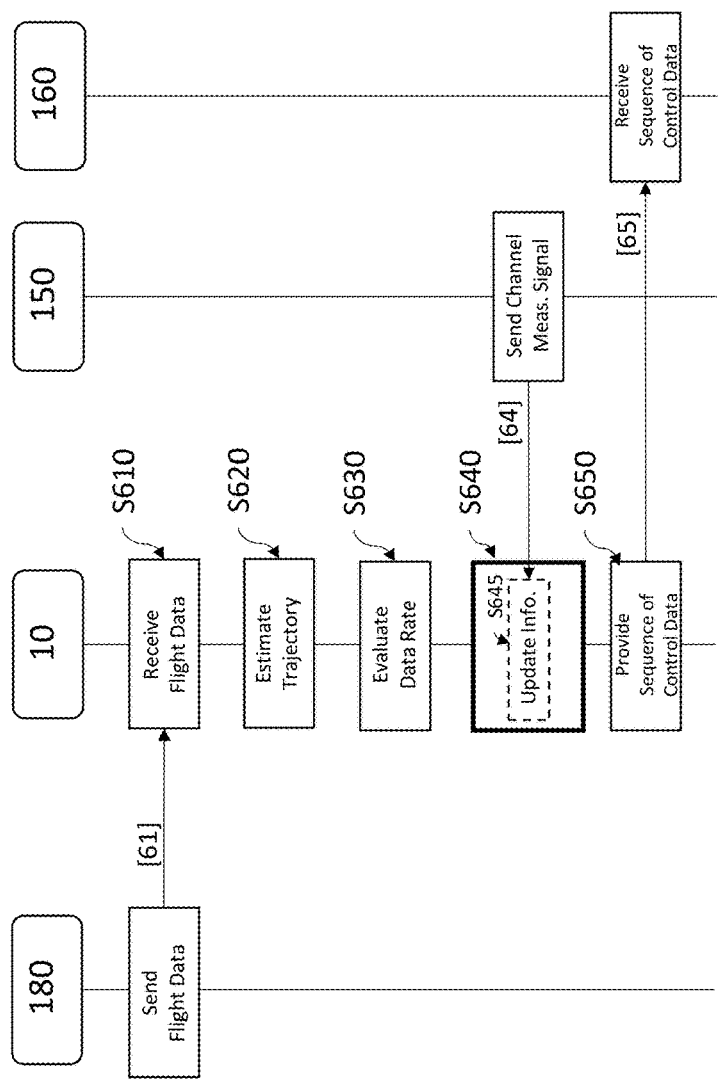
Figure 9:
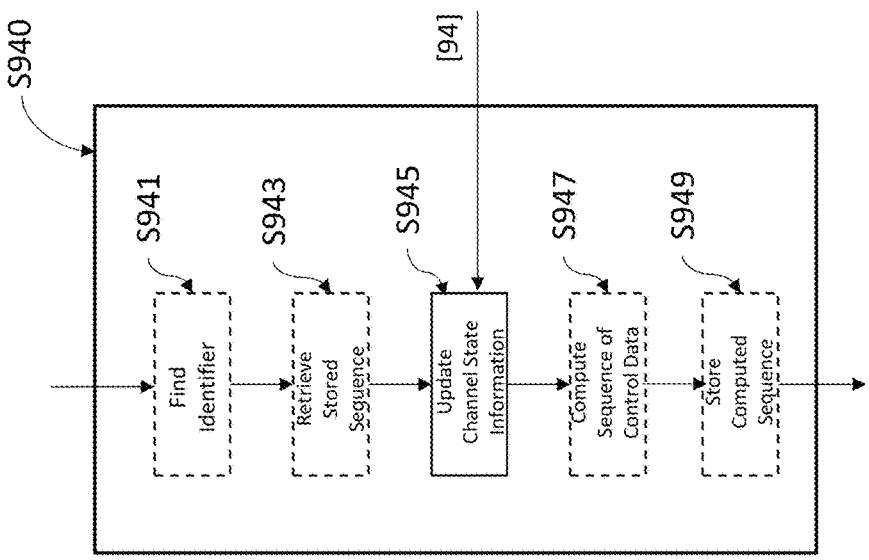
Figure 9:
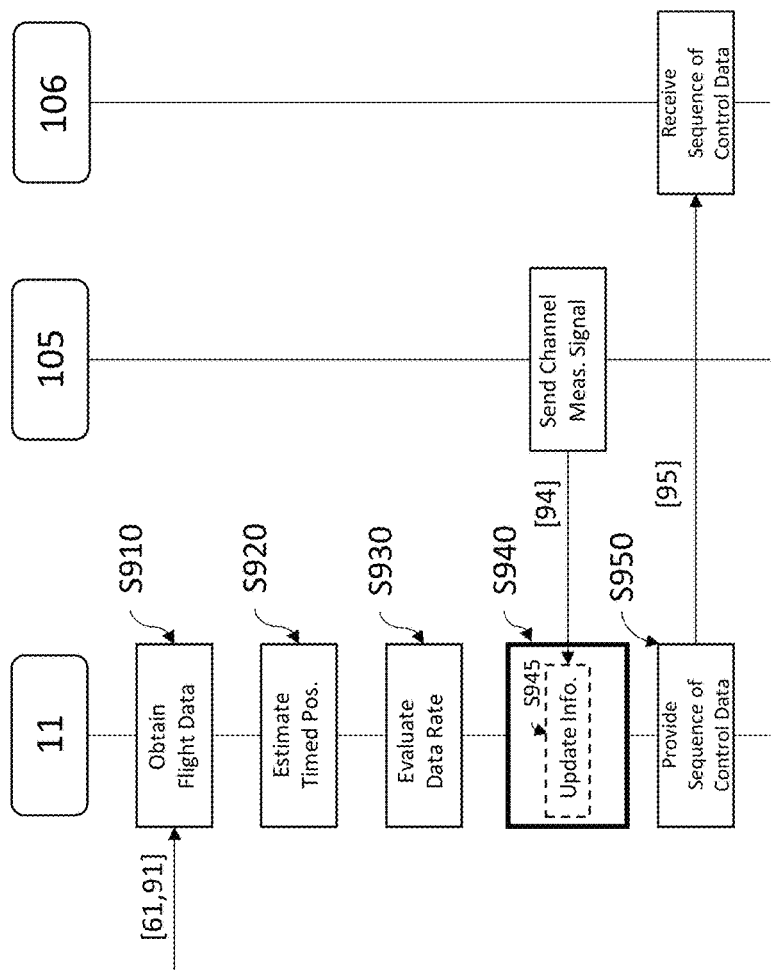

FIGS. 6 and 9 show flowcharts of example embodiments of methods for controlling radio resources of radio units 150, 105, implemented respectively by the apparatuses 10 and 11.

At step S610 the apparatus 10 receives, through input port 20, flight data related to aircraft 100. As previously mentioned, flight data may contain timed trajectory related information, as planned and actual route, thus allowing an estimation of three-dimension coordinates of aircraft's trajectory and moments in time when the aircraft is at respective coordinates. Flight data may contain information related to users' connection requirements, as a data rate.

It is to be noted that flight data may contain planned data and actual data. In case actual data is different from the planned data, step S610 can be repeated.

Based on this information, the apparatus estimates at step S620 a timed trajectory 101 of said aircraft 100 and evaluates at step S630 a required data rate for connection of radio unit 150 to aircraft subsystems and user devices 110 situated in the aircraft 100 moving along the estimated trajectory 101. The evaluated data rate may be used to allocate bandwidth by the current base station 120, to decide how many antennas should be used for connection, or how much transmit power is beneficial, or to decide if another base station would be beneficial for connection.

In order to provide connectivity according to above requirements, a beamforming antenna system 160 should form and/or select one or more radio beams 170 directed towards the aircraft 100 moving along the estimated trajectory 101.

Alternatively or complementarily, a massive MIMO antenna system 160 may be controlled to form connectivity spots along the timed trajectory 101, providing additional flexibility to the system, as both line-of-sight and none-line-of-sight connectivity spots may be formed. Moreover, several aircrafts may be present simultaneously in the coverage zone served by the radio unit 150; using all antennas of the massive MIMO antenna system, for generating several connection spots may be beneficial for connecting all aircrafts. In various embodiments, all antennas may connect to one aircraft, if e.g. only one is present and needed for connection, or all antennas may connect several aircrafts, or subsets of antennas connects respective aircrafts.

A connectivity plan can be established for each aircraft, taking into account the trajectory related information, like direction, speed, expected moments from entering and exiting the coverage region served by radio unit 150, expected handover moment, number of potential users/required data rate, etc. Of course, the connectivity can be planned for several aircrafts possibly present simultaneously in the considered.

The apparatus 10 identifies the number, the directions and the duration of radio beams and/or massive MIMO connections spots to be formed in order to cover the estimated trajectory 101 and to support the required data rate.

Next, the apparatus 10 determines the number and transmitted power of antenna elements and transceivers to be activated in order to form identified radio beams and/or massive MIMO connectivity spots.

At step S640, the apparatus 10 determines a sequence of control data, which applied to the antenna system 160 cause said antenna system 160 to form and/or select one or more beams and/or massive MIMO connections spots 170 directed towards said aircraft 100 along the estimated timed trajectory 101 and to allocate a data rate at least equal to the evaluated required data rate. In embodiments implementing massive MIMO antenna systems, the apparatus 10 may perform a step S645 of updating channel state information. This step comprise reception of one or more channel measurement/information signals 64 from the radio unit 150/antenna system 160.

It is to be noted that steps S620, estimating the trajectory, S630 evaluating the required data rate and S640 determining the sequence of control data, can be executed at least partially in advance, after receiving S610 the planned flight data information. Indeed, for air-to ground systems flight routes are known well in advance, as well as the registered number of users and aircraft subsystems likely to send data during the flight. Knowledge of this information enables early execution of necessary signal processing, such as antenna weight calculation, which is particularly time consuming in case of massive MIMO antenna systems. Implementing this early signal processing allows to distribute over time the computing tasks. This implies less real-time constraints for the embedded system, avoiding computing load peaks and enabling optimization of computing and power resources of the apparatus 10.

As already mentioned, if actual flight data is different from the planned flight data, step S610 receiving flight data can be repeated. In this case, steps S620 estimating the trajectory, S630 evaluating the required data rate and 640 determining the sequence of control data are also repeated. However, for aircrafts in air-to-ground systems only slight and infrequent variations could be expected, allowing re-use of stored results obtained from flight data of previous same flight routes, at least as starting point. The stored results may comprise timed trajectory information and radio control data, e.g. antenna weights and transceivers to be activated, and the moments when said radio control data should be applied.

Then, at step S650, the apparatus 10 provides the determined sequence of control data 65 to said antenna system 160, according to real time requirements, causing the radio beam and or/massive MIMO connectivity spots to be formed according to the actual requirements.

An apparatus 11 may implement a similar method to control radio resources of the radio unit 105 serving the transceiver station 102, as illustrated in FIG. 9. At step S910, the apparatus 11 obtains flight data 61 related to the aircraft 100 and location data 91 related to base stations 120,120', and at step S920 it estimates a timed position of the aircraft 100 relative to base stations 120,120', as a function of flight data 61 and location data 91. Steps S930, S940, S945 and S950 are similar to steps S630, S640, S645 and S650 respectively.

In some example embodiments, determining in S640 the sequence of control data can be optimized by re-using previous knowledge of the flight routes and previously calculated antenna configuration, antenna weights as well as transceivers activation data. Indeed, in case of potential recurrent flights, same control data could be used, as only slight differences could be expected between these flights. In this case computing a new sequence of control data will only require slight updating, thus reducing the processing effort.

In order to benefit from the flights' recurrence the apparatus 10 uses the flight route information for allocating an identifier to the flight data 61 and/or to the trajectory 101. Once computed, the sequence of control data, i.e. antenna weights and transceivers activation, may be stored using the allocated identifier, such as a flight number, or start and end coordinates of the trajectory, time schedules, etc.

In these embodiments of the method, the apparatus 10 executes an optimized determination of the sequence of control data by first finding at step S641 an identifier of flight data 61 and/or of the timed trajectory 101. Of course, if the flight data and/or trajectory are unknown, the apparatus 10 may create a new identifier, thus enabling the implementation of the optimized determination for future occurrences of this flight route. In various embodiments, from time to time it can be checked, if stored flight data has been reused; if some data has not been used for a predefined time period, it can be deleted in order to save memory.

Then, at step S643 the apparatus 10 retrieves a previously stored sequence of control data associated to said identifier. Recalling the stored data set associated with said identifier allows reducing the complexity and computing effort for processing. Indeed, the stored data could at least be used as starting point or approximate data, which could if necessary be updated with minor processing effort.

Additionally, as in air-to-ground systems usually no obstacles are expected to change the transmission conditions, re-using previously stored antenna weights alleviates the need for frequent channel measurements.

The apparatus 10 may optionally execute a step S645 of updating channel state information 64 for said antenna system 160. This step can be executed with a reduced frequency in case of recurring events and storing of calculated results, as long as the aircraft is following the previously stored timed trajectory and the channel state information presents limited variations compared to former flights. Executing this step of the method with reduced frequency advantageously allow power and computing resources savings.

Then, at step S647 the apparatus computes the sequence of control data, according to said previously stored sequence of control data 65 and updated channel state information 64.

The obtained sequence of control data is then stored in the memory 22 at step S649, in a data structure associated with flight data and/or trajectory's identifier, for example a lookup table, thus enabling the stored data to be recalled for a later occurrence of the flight route, and avoiding unnecessary signal processing and reducing computing effort.

An apparatus 11 may implement a similar method to control the radio resources of the radio unit 105 serving the transceiver station 102, as illustrated in FIG. 9. At step S910, the apparatus 11 obtains flight data 61 related to the aircraft 100 and location data 91 related to said base station 120,120' and at step S920 it estimates a timed position of the aircraft 100 relative to base stations 120,120', as a function of flight data 61 and location data 91. At step S941 an identifier of flight and location data and/or of the timed position is found. This identifier is then used as starting point for performing steps S943, S945, S947 and S949, in a similar way to steps S643, S645, S647 and S649 respectively.

It is to be noted that steps
- S641, S941, finding an identifier of said timed flight data and/or of the timed trajectory, respectively of said flight and position data and/or timed position;
- S643, S943, retrieving a previously stored sequence of control data associated to said identifier;
- optionally S645, S945, updating channel state information 64, 94;
- S647, S947, computing a sequence of control data 65, 95, as a function of said previously stored sequence of control data and optionally of updated channel state information 64, 94; and
- S649, S949, storing the sequence of control data 65, 95; may be executed in combination with or independently of steps S630, S930, evaluating a required data rate for connection of the transceiver station 102 to base stations 120, 120'. Performing these steps allows in both cases distribution over time of computing tasks, and optimization of computing and power resources of apparatus 10.

In various embodiments an identifier may be allocated to flight data 61, for a method implemented by apparatus 10, respectively to flight data 61 and position data 91, for a method implemented by apparatus 11. In these embodiments steps S620 estimating a timed trajectory, respectively S920 estimating a timed position can be advantageously simplified, as said timed trajectory and timed position can be computed at the first occurrence of a flight route, stored, and retrieved by apparatuses 10, 11 at subsequent occurrences of the same flight route.

Another example embodiment of the apparatus 10 will now be described in reference to FIGS. 3 and 4.

The mobile communications system 1 comprises a plurality of radio units 150, 150', and the apparatus 10 is configured to control the antenna systems 160, 160' of the plurality of radio units (150, 150'). The apparatus 10 is configured to obtain information related to traffic load of the plurality of radio units 150, 150' and to coordinate e.g. the data rate allocation between said radio units 150, 150'.

The apparatus 10 is configured to perform antenna weight calculation and transceivers control for radio units 150 and 150', or more generally for a plurality of radio units. If triggered by the apparatus 10 via the communications port 24, the individual antenna systems 160, 160' perform channel measurements and provide the channel state information to apparatus. Based on the evaluated required data rate for the considered aircraft 100, on existing traffic load served by radio units 150, 150', on channel state information, and on potential content off-loading and/or handover information, the apparatus 10 allocates the data rates to be served by each radio units in a coordinated manner.

Figure 3:
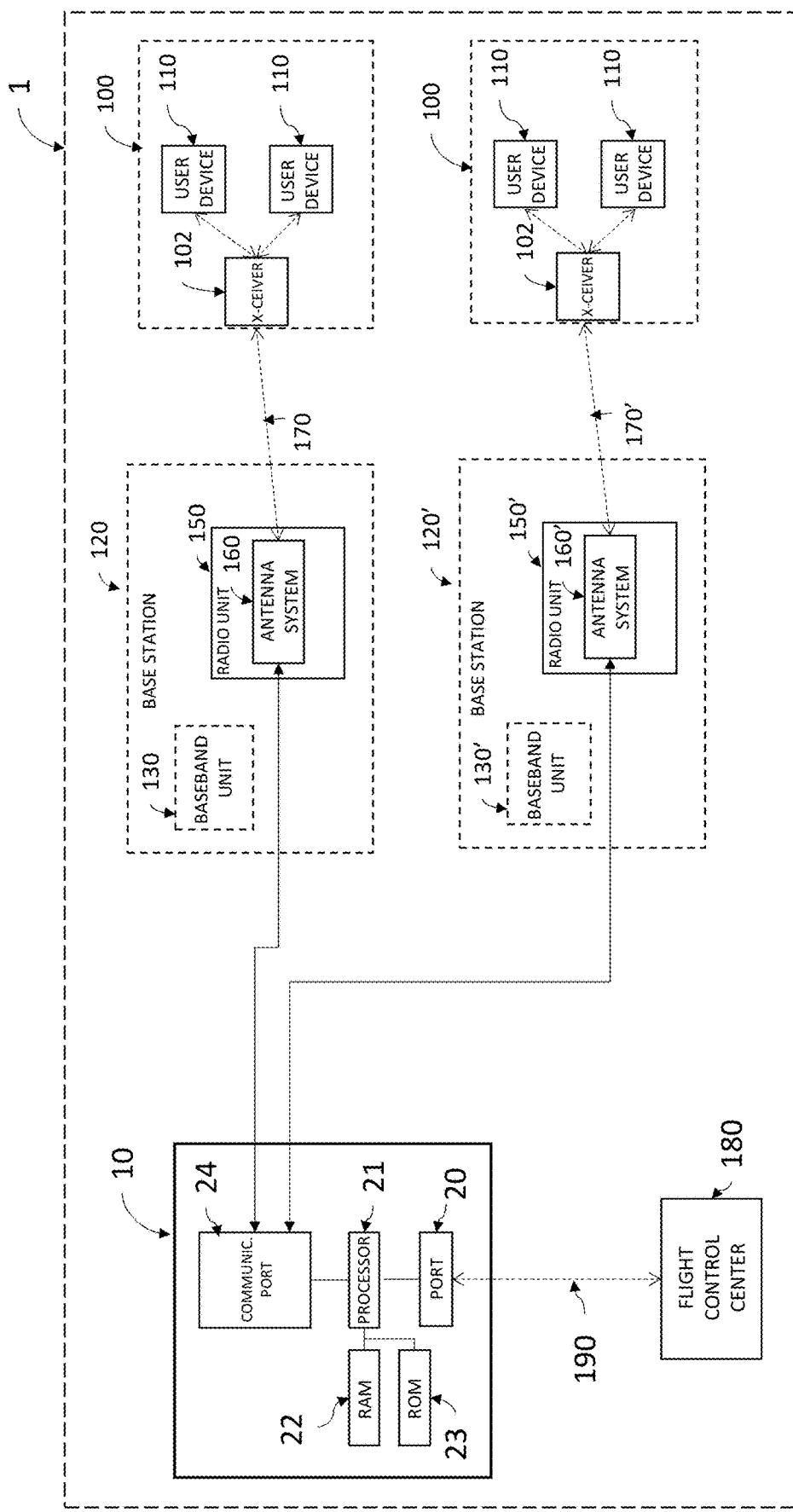

In an embodiment, illustrated in FIG. 3, the apparatus 10 is implemented as a device distinct from the baseband unit 130 of the base station 120.

Figure 4:
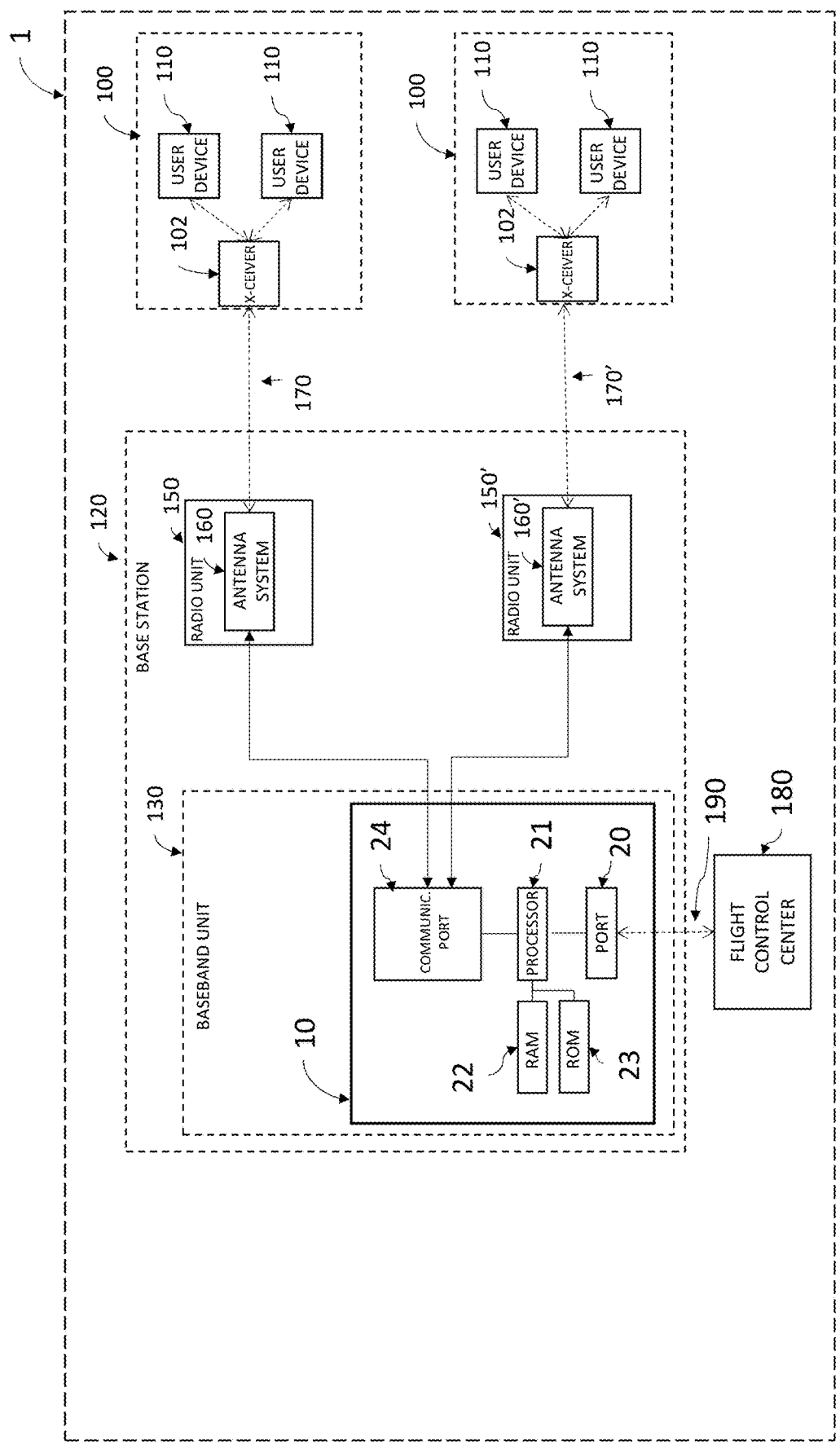

Alternatively, the apparatus 10 can be integrated to the baseband unit 130 of the base station 120, as illustrated in FIG. 4

Figure 5:
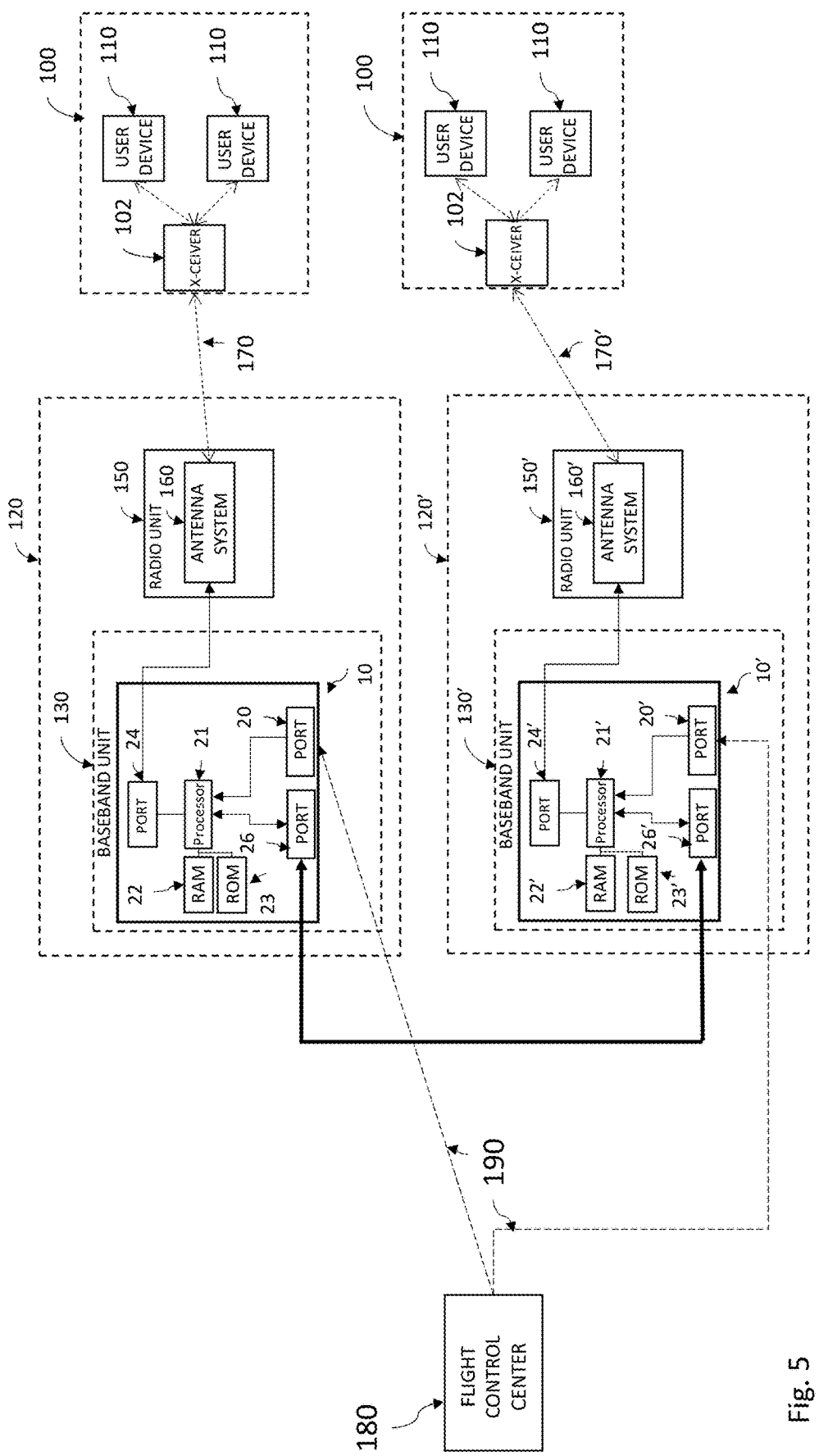

Another example embodiment of the apparatus 10 will now be described in reference to FIG. 5. The mobile communications system 1 comprises a plurality of apparatuses 10, 10' for controlling radio resources of a plurality of radio units 150, 150', respectively, an apparatus 10, 10', being associated to a radio unit 150,150', respectively and providing antenna weights and transceiver control data only to their associated radio units. An apparatus 10 according to this embodiment further comprises a bidirectional port 26, enabling communication between the apparatuses 10, 10'. The apparatus 10 is configured to exchange with other similar apparatuses information related to traffic load of respective associated radio units 150'. The apparatuses 10, 10' are configured for coordinating each other for improved antenna weight computing and transceiver control data. This distributed architecture is advantageous especially in case of hand over and/or content off-loading situations, or if another antenna system could more beneficially take over connectivity e.g. in case of better connectivity conditions, less processing load or higher available data throughput.

Figure 7:
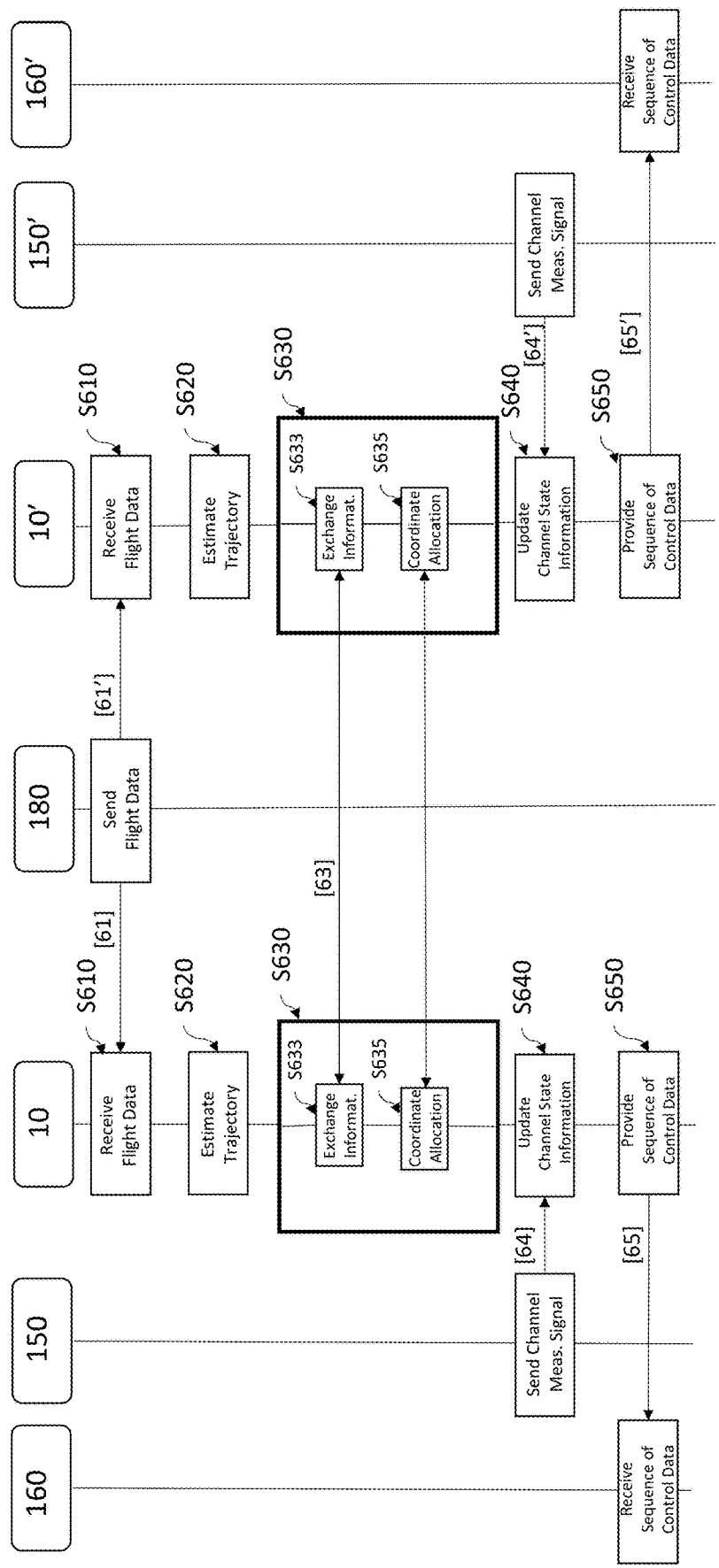

FIG. 7 shows an example embodiment of a method for controlling radio resources by apparatuses 10 and 10' in the above described distributed architecture.

The mobile communications system 1 comprises a plurality of apparatuses, of which only two, 10 and 10' are illustrated, for controlling radio resources of a plurality of radio units, in this example 150 and 150'. The apparatuses 10, 10' are configured to communicate through bidirectional ports 26, 26'.

Steps S610 receiving flight data information and S620 estimating a trajectory of aircraft 100 are similar to steps S610 and S620 of previously described embodiment of the method.

In the distributed architecture, step S630 evaluating a required data rate for connection comprises
    a step S633 for exchanging information related to traffic load and/or traffic conditions of respective radio units 150 and 150' between apparatuses 10 and 10' and
    a step S635 for coordinating the data rate allocation between said radio units 150, 150'.

As in the distributed architecture, exchanged traffic load information may comprise existing traffic load already served by radio units 150, 150', channel state information, and potential handover information.

Figure 8:
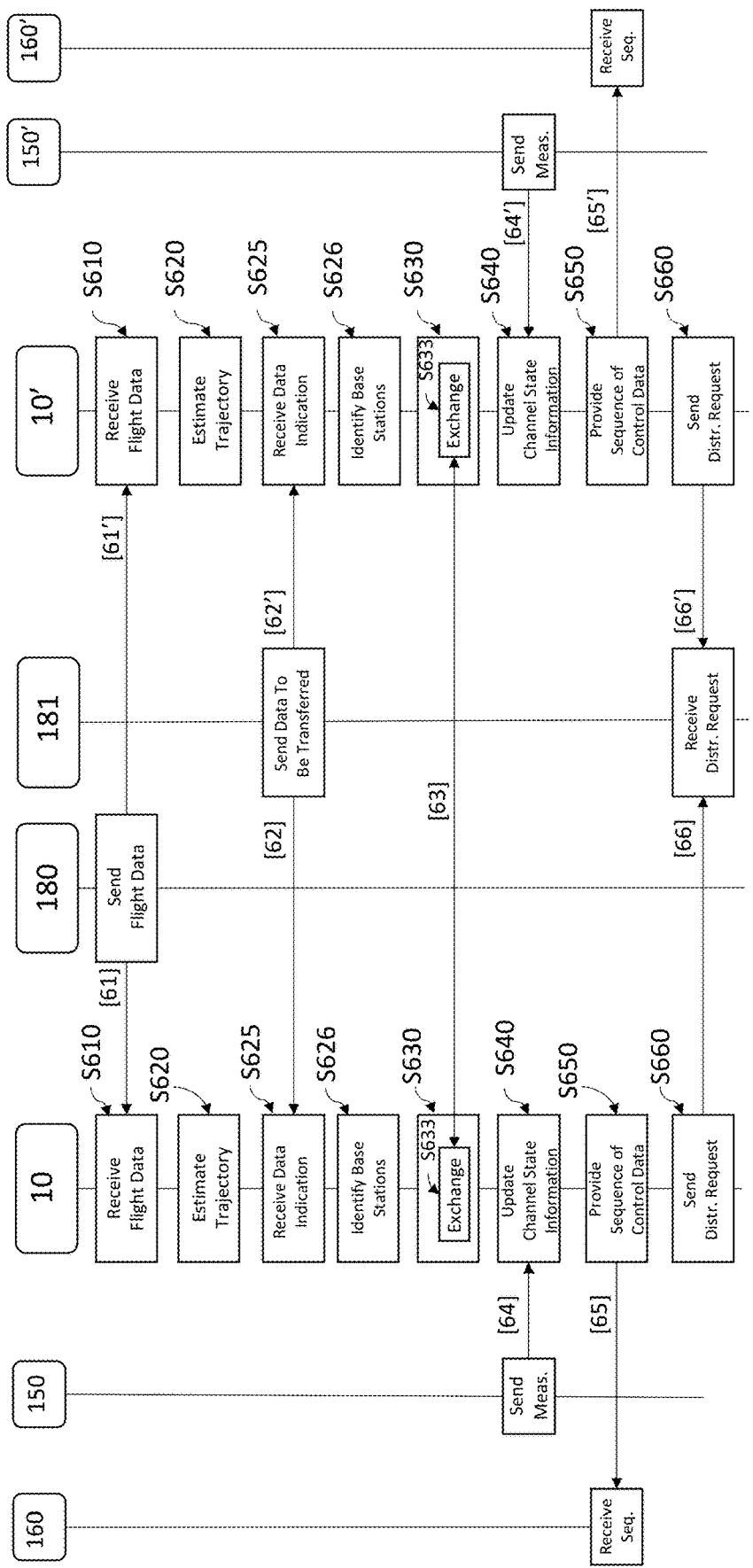

Another embodiment of the control method will be described now in reference to FIG. 8. The mobile communication system 1 implements previously described distributed architecture and further comprises a content data center 181 apt to transfer data content to users' devices and aircraft subsystems 110, via the transceiver station 102 and the on board relay 104.

At step S625 apparatus 10, 10' receives an indication 62, 62', of data to be transferred from the content data center 181 to transceiver station 102.

Then, at step S626, are identified the base stations 120, 120' in the coverage zone of which the aircraft 100 moves along the timed trajectory 101, as well as the time and duration of coverage for each of identified base stations 120, 120'.

According to this embodiment, step S633 further comprises exchanging information related to data to be transferred; such information may be deduced from data transfer indications 62, 62'.

Steps S640 and S650 are similar to those of previously described embodiments.

Then, at step S660 the apparatus 10, 10', sends to the content data center 181 a distribution request, 66, 66', of the data content among identified base station 120, 120'.

It is to be noted that step S660 may be executed in a different order with respect to steps S640 and S650.

Various embodiments of controlled methods may be implemented by computer programs, which may be stored on a computer-readable storage medium.

Figure 10:
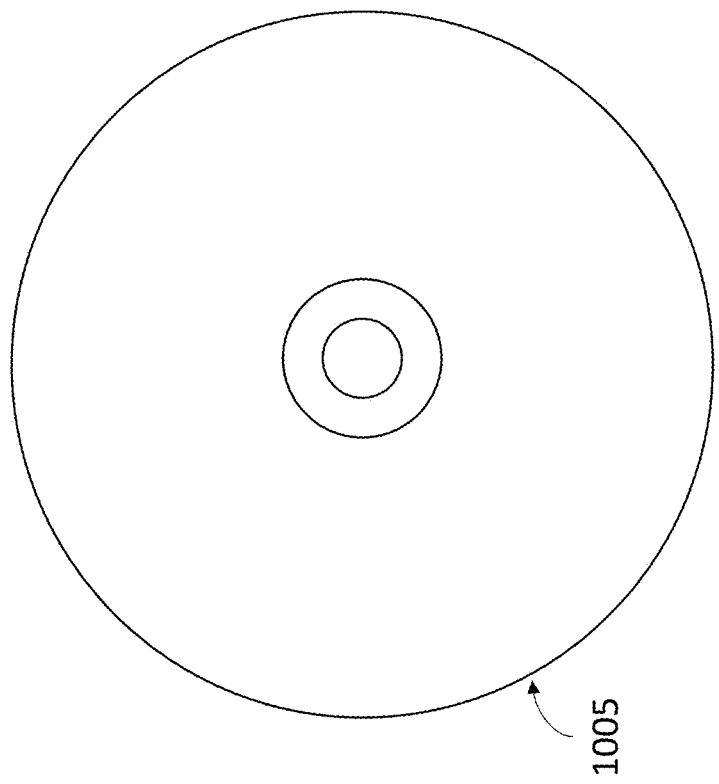
FIG. 10 illustrates examples of computer readable storage media, storing a computer program according to an example embodiment of the invention.
Figure 10:
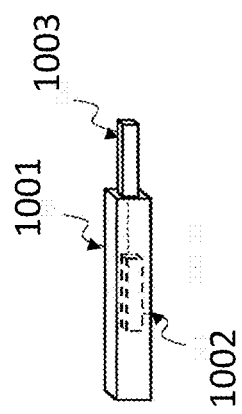

FIG. 10 shows tangible media, respectively a removable memory unit 1001 and a compact disc, CD, 1005, storing computer-readable code which, when run by a computer, may perform methods according to embodiments described above. The removable memory unit 1001 may be a memory stick, e.g. a USB memory stick, having internal memory 1002 storing the computer-readable code. The memory 1002 may be accessed by a computer system via a connector 1003. The CD 1005 may be a CD-ROM or a DVD or similar. Other forms of tangible storage media may be used.

Embodiments of the present invention may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any non-transitory media or means that can contain, store, communicate, propagate or transport the instructions for use by or in connection with an instruction execution system, apparatus, or device, such as a computer.

Reference to, where relevant, 'computer-readable storage medium', "computer program product", "tangibly embodied computer program" etc., or a "processor" or "processing circuitry" etc. should be understood to encompass not only computers having differing architectures such as single/multi-processor architectures and sequencers/parallel architectures, but also specialised circuits such as field programmable gate arrays FPGA, application specific circuits ASIC, signal processing devices and other devices. References to computer program, instructions, code etc. should be understood to express software for a programmable processor, firmware such as the programmable content of a hardware device as instructions for a processor or configuration settings for a fixed function device, gate array, programmable logic device, etc.

As used in this application, the term "circuitry" refers to all of the following:
    a. hardware-only circuit implementations (such as implementations in only analogue and/or digital circuitry);
    b. combinations of circuits and software (and/or firmware), such as (as applicable):
        i. a combination of processor(s); or
        ii. portions of processor(s)/software (including digital signal processor(s)), software, and memory(ies) that work together to cause an apparatus, such as a server, to perform various functions); and
    c. circuits, such as a microprocessor(s) or a portion of a microprocessor(s), that require software or firmware for operation, even if the software or firmware is not physically present.

If desired, the different methods and method steps discussed herein may be performed in a different order and/or concurrently with each other. Furthermore, if desired, one or more of the above-described methods and method steps may be optional or may be combined. Similarly, it will also be appreciated that the flow diagram of FIGS. 6, 7, 8 and 9 are examples only and that various operations depicted therein may be omitted, reordered and/or combined. It will be appreciated that the above described example embodiments are purely illustrative and are not limiting on the scope of the invention. Other variations and modifications will be apparent to persons skilled in the art upon reading the present specification.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

The invention claimed is:

1. Method for controlling radio resources of at least one radio unit of at least one base station in a mobile communications system, said radio unit being provided with a beamforming and/or a massive multiple-input and multiple-output (MIMO) antenna system and being apt to establish a telecommunication link with at least one transceiver station carried by an aircraft, the method being implemented by an apparatus configured to control said antenna system by using control data, the method comprising the steps of:
receiving flight data related to said aircraft;
estimating a timed trajectory of said aircraft, as a function of the flight data;
evaluating a required data rate for connection of said transceiver station to said base station, as a function of the flight data;
determining a sequence of control data for said antenna system to form and/or select at least a radio beam and/or a connectivity spot directed towards said transceiver station, and to allocate a data rate at least equal to the evaluated required data rate; and
providing the sequence of control data to said antenna system.

2. Method according to claim 1, wherein the mobile communications system comprises a plurality of radio units, the apparatus being configured to control the antenna systems of the plurality of radio units, and wherein evaluating the required data rate comprises
obtaining information related to traffic load and/or traffic conditions of the plurality of radio units, and
coordinating the data rate allocation and/or handover between said radio units.

3. Method according to claim 1, wherein the mobile communications system comprises a plurality of apparatuses for controlling radio resources and a plurality of radio units an apparatus being associated to a radio unit, the apparatuses further comprising at least a bidirectional communications port enabling communication between said apparatuses, and wherein evaluating the required data rate comprises:
exchanging with at least another apparatus information related to respective traffic load and/or traffic conditions of associated radio units, and
coordinating the data rate allocation and/or handover between said radio units.

4. Method according to claim 1, wherein the mobile communication system further comprises a content data center apt to transfer data content to the transceiver station, the method further comprising
receiving an indication of data to be transferred from the content data center to the transceiver station;
identifying the base stations in the coverage zone of which the aircraft moves along the timed trajectory, and the time and duration of coverage for each of identified base stations; and
sending to the content data center a distribution request of the data content among identified base station for further transfer from identified base station to the transceiver station.

5. Method according to claim 1, wherein determining the sequence of control data comprises the steps of:
finding an identifier of said timed trajectory;
retrieving a previously stored sequence of control data associated to said identifier of the timed trajectory;
computing the sequence of control data, as a function of said previously stored sequence of control data; and
storing the sequence of control data.

6. Method according to claim 5, wherein the radio unit is provided with a massive MIMO antenna system and wherein determining the sequence of control data further comprises, previously to computing the sequence of control data,
updating channel state information for said antenna system, and wherein computing the sequence of control data, is further a function of the updated channel state information.

7. Method for controlling radio resources of at least one radio unit of at least one transceiver station carried by an aircraft, said radio unit being provided with a beamforming and/or a massive multiple-input and multiple-output (MIMO) antenna system, and being apt to establish a telecommunication link with at least one base station in a mobile communications system, the method being implemented by an apparatus (11) configured to control said antenna system by using control data, the method comprising the steps of:
obtaining flight data related to said aircraft and location data related to said base station;
estimating a timed position of said aircraft relative to said base station, as a function of the flight data and location data;
evaluating a required data rate for connection of said transceiver station to said base station as a function of the flight data;
determining a sequence of control data for said antenna system to form and/or select at least a radio beam and/or a connectivity spot directed towards said base station, and to allocate a data rate at least equal to the evaluated required data rate; and
providing the sequence of control data to said antenna system.

8. Method according to claim 7, wherein the mobile communication system further comprises a content data center apt to transfer data content to the transceiver station, the method further comprising
a step of receiving an indication of data to be transferred from the content data center;
identifying the base stations in the coverage area of which the aircraft moves along the timed trajectory, and the time and duration of coverage for each of identified base stations;
sending to the content data center a distribution request of the data content among identified base station for further transfer from identified base station to the transceiver station.

9. Method according to claim 1, wherein determining the sequence of control data comprises the steps of:
- finding an identifier of said timed trajectory;
- retrieving a previously stored sequence of control data associated to said identifier of the timed trajectory;
- computing the sequence of control data, as a function of said previously stored sequence of control data; and
- storing the sequence of control data.

10. Method according to claim 1, wherein the radio unit is provided with a massive MIMO antenna system and wherein determining the sequence of control data further comprises, previously to computing the sequence of control data,
- updating channel state information for said antenna system, and wherein computing the sequence of control data is a function of the updated channel state information.

\* \* \* \* \*